Patented Oct. 13, 1936

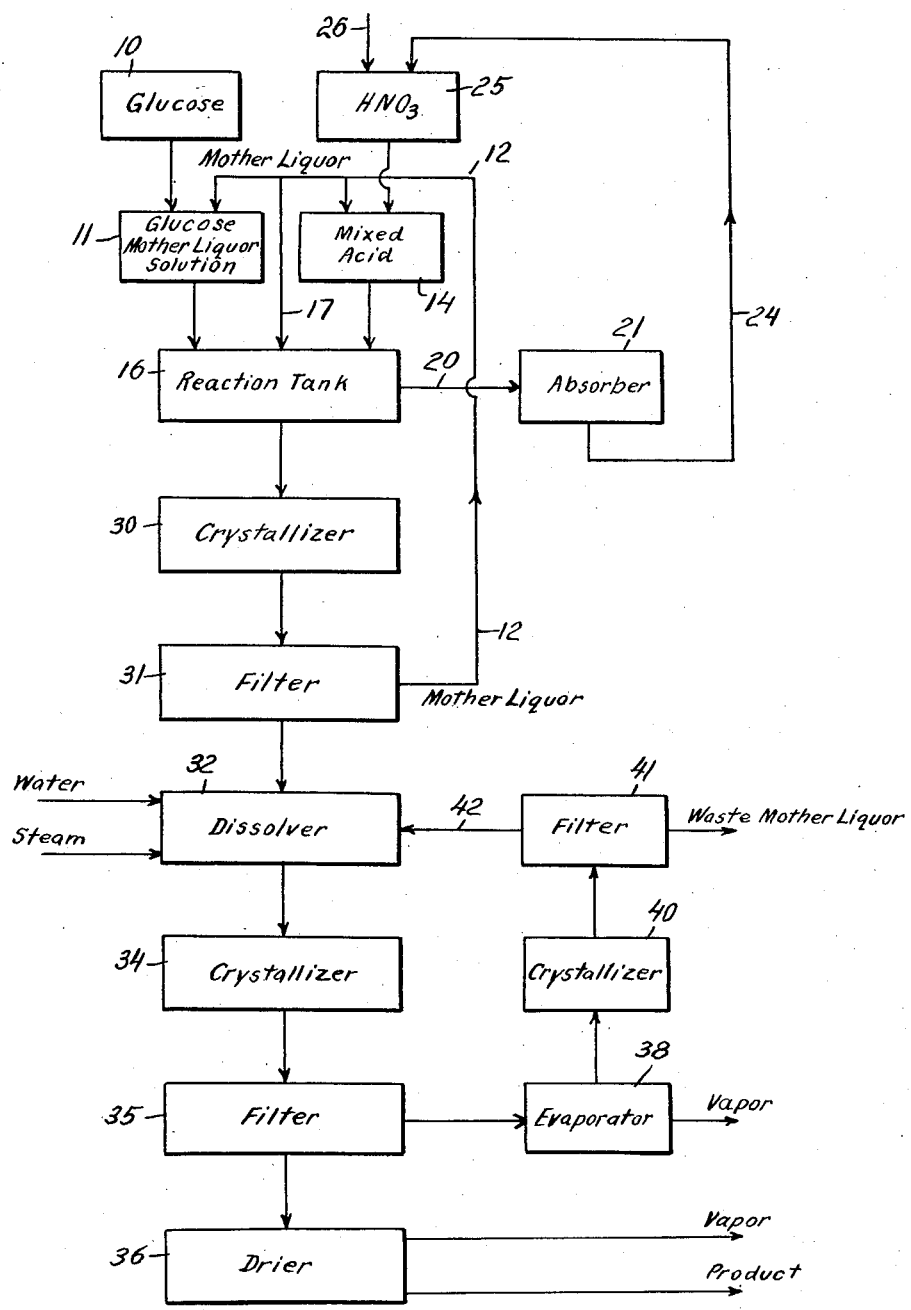

2,057,119

UNITED STATES PATENT OFFICE 2,057,119

METHOD OF PRODUCING OXALIC ACID

George Stevens Simpson, Plainfield, N. J., assignor to General Chemical Company, New York, N. Y., a corporation of New York Application August 9, 1933, Serial No. 684,302

10 Claims. (Cl. 260—119)

This invention relates to the manufacture of oxalic acid by oxidation of carbohydrates by nitric acid.

Oxidation of carbohydrates, such as cane sugar, glucose, other sugars or mixtures thereof, starch, dextrin, etc., to oxalic acid by treating with nitric acid is well known. It has also been suggested to oxidize carbohydrates with nitric acid in the presence of sulfuric acid and small amounts of catalyzers such as vanadium pentoxide, other vanadium compounds, or other catalytic agents such as molybdenum or manganese.

The present invention relates particularly to the oxidation of carbohydrates by nitric acid in the presence of sulfuric acid and catalytic material, and has for the primary object the provision of a method by which increased yields of oxalic acid may be obtained. The invention also aims to provide a method of such nature as may be readily controlled, when worked on a plant scale, and by which side reactions, largely responsible for decreased yields, are avoided.

Among the important features of the process of the present invention are temperature control during the oxidation reaction, and the maintenance in the reaction mass of nitric acid not greatly in excess of the carbohydrate and preferably maintenance of an excess of carbohydrate in the reaction mass.

The process of the invention may be advantageously carried out by one of two preferred procedures. The first of these may be carried out in either a batch or a continuous operation. In this method when proceeding batchwise, oxalic acid mother liquor, recovered from a previous reaction mass and containing for example about 50% sulfuric acid, is run into the reaction tank or vat. A "mixed acid" solution containing sulfuric acid and nitric acid is prepared in a make-up tank. As a source of the sulfuric acid a further quantity of oxalic acid mother liquor may be employed. Also, a small amount of sulfuric acid from an external source may be added to the mixed acid solution to make up the sulfuric acid loss in the previous cycle. The batch of sulfuric acid mother liquor in the reaction tank is heated to preferably about 150° F., and the mixed acid solution of sulfuric and nitric acids, and a sugar solution are continuously introduced into the reaction tank. The rates of introduction of the mixed acid solution and of the sugar solution are preferably regulated so that the total sugar solution is fed into the tank in a shorter period of time than is the mixed acid solution, thus maintaining an excess of sugar solution in the reaction mixture. During the reaction the temperature of the mass is preferably maintained not less than about 150° F. and not more than about 160° F. Temperature control may be had by regulating the rate of addition of the oxidizing agent and the sugar solution, or by cooling coils, immersed in the bath, or preferably both. On completion of the reaction, the charge, containing chiefly oxalic acid, sulfuric acid and water, is run into a cooler, to crystallize oxalic acid. The latter is filtered out of the mother liquor which is returned to the process for use in making up a subsequent batch.

A second preferred procedure may be employed to advantage where it is more desirable to operate on a batch basis. When proceeding by this modification, sulfuric acid containing oxalic acid mother liquor from a previous batch is run into the reaction tank, and sufficient sulfuric acid from an external source is added thereto to make up for the sulfuric acid loss in the previous cycle. A solution containing the full amount of sugar or other carbohydrates to be oxidized in the particular operation is then fed into the reaction tank. The mass is heated to about 150° F., and thereafter the nitric acid is introduced while maintaining the temperature during the reaction preferably within the range 150–160° F.

It has been found that by controlling the temperature during the oxidation reaction so that the temperature of the batch is not less than about 145° F., and preferably not less than about 150° F. and not more than about 160° F., dangerous side reactions are avoided, the rate of the reaction is increased and increased yield of oxalic acid is obtained. In practicing the process, the temperature control may be advantageously effected by regulating the rate of addition to the reaction mass of the mixed acid and sugar solution in the first preferred procedure, and of the nitric acid of the second preferred procedure, and also by removing excess heat by circulating cooling medium through coils disposed in the reaction tank. In both these methods, it will be understood the mass in the reaction tank is initially heated to temperatures preferably not less than about 150° F. before addition of nitric acid to effect oxidation of carbohydrates.

A further important element of the process involves the control of conditions in the reaction mass during oxidation so as to avoid a material excess of oxidizing agent. Although operations may be conducted so that nitric acid is not present in the reaction mass greatly in excess of reacting proportions with the carbohydrate, it is preferred to proceed so that there is an excess of carbohydrate in the reaction mixture. In the first of the preferred procedures, in which the mixed nitric and sulfuric acid solution and the carbohydrate solution are continuously added to the reaction tank, the sugar solution is preferably introduced at a slightly greater rate than the mixed acid solution so that there is present at all times in the reaction mass a slight excess of sugar, up to the point where the batch is to be finished at which time proper amount of nitric acid must be added to balance the excess of sugar in the reaction tank. In the second procedure, all of the sugar employed in a single reaction is initially introduced into the batch tank, the nitric acid is subsequently added, so that in this procedure there is always in the reaction tank an excess of sugar.

The procedure involved in the above preferred modification of the process may be more clearly understood from the following further specific example taken in connection with the accompanying drawing showing a flow sheet illustrating diagrammatically apparatus employed.

The carbohydrate preferably employed is a water solution, maintained in tank 10, containing about 60% glucose ($C_6H_{12}O_6$). About 2112 pounds of glucose solution from tank 10 are run into mix tank 11 and diluted with about 718 pounds of crude oxalic acid mother liquor from line 12, the oxalic acid mother liquor containing about 50% sulfuric acid. This dilution of glucose produces a solution sufficiently fluid to flow freely. Fluidity of the glucose might also be obtained by heating in which case dilution with mother liquor would not be necessary. About 5153 pounds of approximately 90% nitric acid or its equivalent are diluted in mix tank 14 with about 6320 pounds of crude oxalic acid mother liquor from line 12. About 116 pounds 100% sulfuric acid and about an equal weight of water, from extraneous sources, are introduced into the mixed acid solution in tank 14 to make up for the loss of sulfuric acid in the previous batch and to provide the desired degree of dilution in the main reaction tank.

About 8448 pounds of crude oxalic acid mother liquor are pumped into reaction tank 16 through line 17, and about an ounce of vanadium pentoxide may be added. The liquor in vat 16 is heated to about 150° F., and about 10 gallons of the mixed sulfuric and nitric acid from tank 14 are added to prevent charring of the glucose solution by the sulfuric acid of the mother liquor in tank 16, during the initial addition of glucose solution.

The glucose solution from tank 11 may then be introduced into reaction tank 16 uniformly, through a suitable weir, in about 19 hours, and the mixed acid from tank 14 is introduced simultaneously over a period of about 20 hours. By this procedure, there is maintained in the reaction tank a slight excess of sugar. The charge in the reaction tank should preferably be agitated during the addition of the glucose solution and the mixed acid solution to prevent local reaction, and to assist in the evolution of the oxides of nitrogen which are withdrawn from the reaction tank 16 and introduced through line 20 into a suitable nitric acid absorption system, illustrated diagrammatically at 21. The product nitric acid of the absorbing system, preferably after concentration, is run through line 24 into a nitric acid storage tank 25 into which may be fed, through line 26, quantities of nitric acid from an extraneous source to make up for nitric acid loss in the process.

After the addition of the mixed sulfuric and nitric acid solution, agitation is preferably continued to complete removal of oxides of nitrogen which, in the case of a batch operation, should be complete in about 2 hours. The temperature of the mixture in tank 16 is controlled throughout the oxidation reaction so that the temperature of the mass is preferably not less than about 150° F., and generally within the range 150–160° F. When introducing the glucose and the mixed acid solution at about the rate indicated, the temperature of the mass is maintained generally not less than about 150° F., and should the temperature rise undesirably, cooling may be effected by means of cooling coils in the vat.

After completion of the oxidation reaction in tank 16, the charge is run into crystallizer 30, and cooled with agitation to about 75° F. by means of cooling medium circulated through suitable coils. The charge as run into the crystallizer may contain about 2459 pounds oxalic acid, 7633 pounds sulfuric acid, 7633 pounds of water, and about 2 pounds of vanadium pentoxide. After cooling, in which operation the crude oxalic acid separates out as fine white crystals, the charge is ready for filtering, and for this purpose is run into filter 31. The filtrate from filter 31, in line 12, may comprise about 15,487 pounds of mother liquor comprising about 15,035 pounds of 50% sulfuric acid and about 452 pounds of oxalic acid, together with most of the vanadium pentoxide introduced in the original charge. This mother liquor is returned to the reaction tank 16 and to mix tanks 11 and 14 through line 12.

The cake of filter 31 may contain about 2300 pounds of oxalic acid and about 256 pounds of mother liquor, and is hence about 90% pure. If a purer product is desired, the cake is discharged into the dissolver 32, and dissolved in about 2000 pounds of water. The resulting batch in the dissolver may contain about 2300 pounds of oxalic acid, 128 pounds of sulfuric acid and about 2178 pounds of water. The mass in the dissolver is preferably heated to about 150° F. by means of steam. The hot solution is then pumped into a crystallizing tank 34, preferably equipped with a variable speed, mechanical stirrer and cooling coils. It has been found that decreased speed of agitation aids in forming larger crystals. The charge, after cooling to about 75° F., is filtered in filter 35, given a light water wash, and the wet oxalic acid so obtained, containing about 97–100% $H_2C_2O_4.2H_2O$ is introduced into a drier 36 in which the product is dried at temperatures not exceeding about 150° F. Approximately 2000 pounds of oxalic acid are recovered.

The mother liquor from filter 35 may contain about 300 pounds oxalic acid, about 128 pounds sulfuric acid, and about 2128 pounds of water, and is preferably concentrated in evaporator 38 to recover a major portion of the oxalic acid. In the evaporator, concentration is carried out until the sulfuric acid content is about 50%, at which concentration the liquor is run into crystallizer 40, cooled to about 75° F. and then introduced into a filter 41. The oxalic acid cake of filter 41, in the present example, may contain about 293 pounds oxalic acid and about 33 pounds 50% sulfuric acid, and is transferred to dissolver 32 along with the material from filter 31 and subsequently disolved and recrystallized in crystallizer 34. If the mother liquor from filter 41 contains impurities, the mother liquor may be run to waste. However, indications are that under favorable operating conditions, impurities do not build up in the system, and in this situation, crystallizer 40 and filter 41 may be eliminated and the concentrated liquor of evaporator 38 run into crystallizer 30 or reaction tank 16.

The apparatus involved, particularly the reaction tank 16 and associated parts, may be constructed of lead or suitable acid-proof brick, precaution being also taken to guard against corrosion by free nitric acid and oxides of nitrogen in the upper part of reaction vessel 16 and in the gas lines leading from the reaction vessel to the nitric acid absorbing system 21.

The oxidation reaction may be carried out continuously if so desired. In this situation, it will be understood that the glucose solution in tank 11 and the mixed acid solution in tank 14 are made up as described above, and are continuously introduced simultaneously into the reaction tank 16. The rates of addition of the sugar and of the mixed acid solutions are controlled so that the mass in the reaction tank contains upward of 99% reaction product. In a continuous method, a plurality of reaction tanks in series might be employed to advantage, in which case tanks prior to the last might contain smaller percentages of reaction product. As before the temperature of the batch is maintained preferably not less than about 150° F. Reaction product is, of course, continuously withdrawn from tank 16.

A second preferred procedure, which may be advantageously employed when it is desired to operate the process on a batch basis, is carried out in apparatus substantially the same as illustrated on the flow sheet. In the second preferred procedure however, the materials involved are introduced into the reaction tank in a manner differing from that already described in connection with the previous modification. All the oxalic acid mother liquor, from filter 31, to be used in the batch is charged at once into a reaction tank, such as tank 16, and there is then added thereto sufficient sulfuric acid from an extraneous source to make up for that lost in the previous operation. Secondly, the full amount of sugar or other carbohydrate to be used is then introduced into the reaction tank. The batch is heated to about 150° F. and addition of nitric acid is begun, the temperature of the reaction batch being thereafter maintained preferably as already noted. The capacity of the plant may be increased by artificial cooling of the batch if desired. One example of operation in accordance with the second procedure is as follows:

About 1250 parts of mother liquor containing about 50% sulfuric acid are run into a reaction tank, such as 16. There is then added about 10 parts of 100% sulfuric acid and a small amount of vanadium pentoxide to make up for the loss in the preceding batch. A little mixed sulfuric and nitric acid, may be added to prevent charring of the sugar after addition of the sugar and initial heating of the batch. About 100 parts of sugar in 60–95% aqueous solution are fed into the batch tank, and the mass is heated to about 150° F. About 367 parts of nitric acid in aqueous solution of about 60–90% concentration are continuously introduced into the batch at a rate such that, in conjunction with the amount of heat removed by cooling coils immersed in the mass, the temperature of the reaction is maintained not less than about 150° F. and not more than about 160 F. On completion of the reaction, the reaction mass is run through a crystallizer, such as 30, and through apparatus similar to the apparatus following crystallizer 30 illustrated in the flow sheet to recover the oxalic acid product and the oxalic acid mother liquor for use in subsequent operations.

In carrying out the different modifications of the invention, it is preferred to control operations so that the mass in the reaction tank, after the reaction is complete and aside from the oxalic acid formed, contains about equal parts of sulfuric acid and water. Where the sulfuric acid concentration is materially less, there is an apparent tendency to oxidize oxalic acid in the reaction tank to carbon dioxide, the oxidation reaction appears to be slower, and the solubility of oxalic acid is greater in a liquor of low sulfuric acid concentration. Under these preferred operating conditions, the oxalic acid mother liquor from filter 31 is of about a 50% sulfuric acid concentration, and the amounts of water introduced into the main reaction tank from extraneous sources, as part of the sugar solution, and with the nitric acid, are desirably regulated so that, as noted above, the mass in the reaction tank after the reaction is complete contains, in addition to the oxalic acid, about equal parts of water and sulfuric acid.

I claim:

1. The method of making oxalic acid which comprises reacting carbohydrate material with nitric acid in the presence of sulfuric acid to oxidize the carbohydrate to oxalic acid, and maintaining the carbohydrate in excess of the oxidizing agent during the reaction.

2. The method of making oxalic acid which comprises forming a solution of a carbohydrate, adding nitric acid thereto in such manner as to maintain in the resulting mass an excess of carbohydrate over the nitric acid, whereby carbohydrate is oxidized to oxalic acid.

3. The method of making oxalic acid which comprises reacting carbohydrate material with nitric acid in the presence of sulfuric acid to oxidize the carbohydrate to oxalic acid, maintaining the carbohydrate in excess of the oxidizing agent during the oxidizing reaction, and maintaining the temperature of the reaction at about 150° F. to about 160° F.

4. The method of making oxalic acid which comprises forming a reaction mass comprising sulfuric acid, adding nitric acid to the mass maintained at a temperature not less than about 150° F., and reacting the nitric acid in the mass with a carbohydrate while maintaining the carbohydrate in excess of the reacting proportions with nitric acid whereby the carbohydrate is oxidized to form oxalic acid.

5. The method of making oxalic acid which comprises forming a reaction mass comprising sulfuric acid, slowly adding nitric acid to the mass maintained at a temperature not less than about 150° F., and reacting the nitric acid in the mass with a carbohydrate while maintaining the carbohydrate in excess of the reacting proportions with nitric acid whereby the carbohydrate is oxidized to form oxalic acid.

6. The method of making oxalic acid which comprises forming a solution of a carbohydrate in aqueous oxalic acid mother liquor obtained from a previous operation and having a sulfuric acid concentration of about 50%, forming a mixed acid solution of mother liquor and nitric acid, introducing a quantity of the mother liquor into a reaction zone, heating the mother liquor in the reaction zone to not less than about 150° F., continuously adding thereto the carbohydrate solution and the mixed acid solution in such manner as to maintain in the resulting reaction mass an excess of carbohydrate, whereby carbohydrate is oxidized to oxalic acid, maintaining the temperature of the reaction during oxidation of the carbohydrate at about 150° to about 160° F., and recovering oxalic acid.

7. The method of making oxalic acid which comprises introducing into a reaction zone aqueous oxalic acid mother liquor obtained from a previous operation and having a sulfuric acid concentration of about 50%, introducing into the reaction zone an aqueous solution of a carbohydrate, heating the mass in the reaction zone to about 150° F., continuously introducing into the reaction zone nitric acid whereby carbohydrate is oxidized to oxalic acid, maintaining the temperature of the reaction during oxidation of the carbohydrate at about 150° to about 160° F., and recovering oxalic acid.

8. A process for the production of oxalic acid comprising heating a mixture of mother liquor obtained from a previous operation and containing sulfuric acid and a solution of a carbohydrate, slowly adding nitric acid to the mixture whereby the carbohydrate is oxidized to oxalic acid, and separating oxalic acid from the resulting mother liquor containing sulfuric acid.

9. The method for making oxalic acid which comprises forming a solution of a carbohydrate in a reaction zone, heating the mass in the reaction zone to not less than about 145° F., adding nitric acid to the mass in the reaction zone in quantity to oxidize the carbohydrate to oxalic acid, maintaining the temperature of the reaction during oxidation of the carbohydrate at about 145° F. to about 160° F., and recovering oxalic acid.

10. The method for making oxalic acid which comprises forming a solution of carbohydrate material, reacting the carbohydrate material with nitric acid in the presence of sulfuric acid to oxidize the carbohydrate to oxalic acid, and maintaining the temperature during the entire course of the reaction at about 150° F. to about 160° F.

GEORGE S. SIMPSON.